United States Patent [19]

Olivetti

[11] Patent Number: 5,291,992
[45] Date of Patent: Mar. 8, 1994

[54] JAR UTENSIL KIT

[76] Inventor: Dee Olivetti, 2846 Congress Rd., Pebble Beach, Calif. 93953

[21] Appl. No.: 14,749

[22] Filed: Feb. 8, 1993

[51] Int. Cl.$^5$ ................................................ B65D 69/00
[52] U.S. Cl. ................................... 206/223; 206/542; 206/229
[58] Field of Search ............... 206/216, 223, 542, 541, 206/229, 371, 372, 373, 379, 378, 214, 563, 564; 220/755; 229/1.5 C; 15/236.01, 236.06, 236.07

[56] References Cited

U.S. PATENT DOCUMENTS

| | | | |
|---|---|---|---|
| D. 048,039 | 10/1915 | Niper | 206/564 X |
| D. 170,728 | 10/1953 | Tavolazzi | 206/373 X |
| 400,288 | 3/1889 | Bartlett | 206/379 |
| 944,091 | 12/1909 | Harn | 15/236.06 X |
| 1,701,062 | 2/1929 | Burnham | 206/564 X |
| 1,788,082 | 1/1931 | Byrnes | 206/373 X |
| 1,883,726 | 10/1932 | Warren | 15/236.06 X |
| 2,526,732 | 1/1948 | Cogsdill | 206/223 X |
| 2,534,100 | 12/1950 | Baumgartner | 206/229 X |
| 2,556,797 | 6/1951 | Carlson | 15/236.01 |
| 2,575,431 | 11/1951 | Smith | 206/229 X |
| 2,593,949 | 4/1952 | Williams | 15/236.06 X |
| 2,806,333 | 9/1957 | Head | 15/236.01 X |
| 2,900,656 | 8/1959 | Tupper | 15/236.09 X |
| 3,490,601 | 1/1970 | Hain | 206/372 X |
| 3,749,233 | 7/1973 | McCormick, Jr. | 206/373 |
| 4,619,364 | 10/1986 | Czopor, Jr. | 206/379 |
| 4,627,128 | 12/1986 | Shea | 15/236.07 |
| 4,819,800 | 4/1989 | Wilson | 206/373 |
| 4,987,635 | 1/1991 | Young | 15/236.01 |

FOREIGN PATENT DOCUMENTS

| | | | |
|---|---|---|---|
| 0923342 | 7/1947 | France | 206/216 |
| 0605841 | 7/1948 | United Kingdom | 15/236.07 |
| 1591904 | 7/1981 | United Kingdom | 206/216 |

*Primary Examiner*—Paul T. Sewell
*Assistant Examiner*—Ted Kavanaugh
*Attorney, Agent, or Firm*—Leon Gilden

[57] ABSTRACT

A kit structure includes a plurality of utensils, each having an ellipsoidal head, with each head having a planar body side wall arranged in a parallel spaced relationship relative to an axis of the head coincident with a major axis of the head that in turn is aligned with an associated handle shaft. The handles are formed of resilient material arranged to remove residue component portions within a jar.

1 Claim, 4 Drawing Sheets

JAR UTENSIL KIT

BACKGROUND OF THE INVENTION

1. Field of the Invention

The field of invention relates to jar utensil structure, and more particularly pertains to a new and improved jar utensil kit wherein the same is arranged to provide utensils of variously progressively sized heads and handles for access within jar structure for removal of compositions and components therewithin.

2. Description of the Prior Art

Jars of various sizes are utilized for the storage and subsequent dispensing of various components therefrom, such as creams, lotions, and the like. Removal of such components in the prior art has typically been difficult due to the relatively non-conforming geometric configuration of spoons and such. The instant invention attempts to overcome such deficiencies by providing for an array of spoon members, each including an ellipsoidal head having a planar side wall providing access to various configurations within a jar, wherein the head structure is formed of resilient material and in this respect, the present invention substantially fulfills this need.

SUMMARY OF THE INVENTION

In view of the foregoing disadvantages inherent in the known types of utensil structure now present in the prior art, the present invention provides a jar utensil kit wherein the same is arranged to permit the removal of various components from within a jar cavity relative to the jar wall and floor portion. As such, the general purpose of the present invention, which will be described subsequently in greater detail, is to provide a new and improved jar utensil kit which has all the advantages of the prior art utensil apparatus and none of the disadvantages.

To attain this, the present invention provides a kit structure including a plurality of utensils, each having an ellipsoidal head, with each head having a planar body side wall arranged in a parallel spaced relationship relative to an axis of the head coincident with a major axis of the head that in turn is aligned with an associated handle shaft. The handles are formed of resilient material arranged to remove residue component portions within a jar.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved jar utensil kit which has all the advantages of the prior art utensil apparatus and none of the disadvantages.

It is another object of the present invention to provide a new and improved jar utensil kit which may be easily and efficiently manufactured and marketed.

It is a further object of the present invention to provide a new and improved jar utensil kit which is of a durable and reliable construction.

An even further object of the present invention is to provide a new and improved jar utensil kit which is susceptible of a low cost of manufacture with regard to both materials and labor, and which accordingly is then susceptible of low prices of sale to the consuming public, thereby making such jar utensil kits economically available to the buying public.

Still yet another object of the present invention is to provide a new and improved jar utensil kit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 4, 4a, 4b, 4c, and 4d are top views of the respective first, second, third, and fourth resilient heads of each spoon member of the invention.

DESCRIPTION OF THE PREFERRED EMBODIMENT

Figure 1:
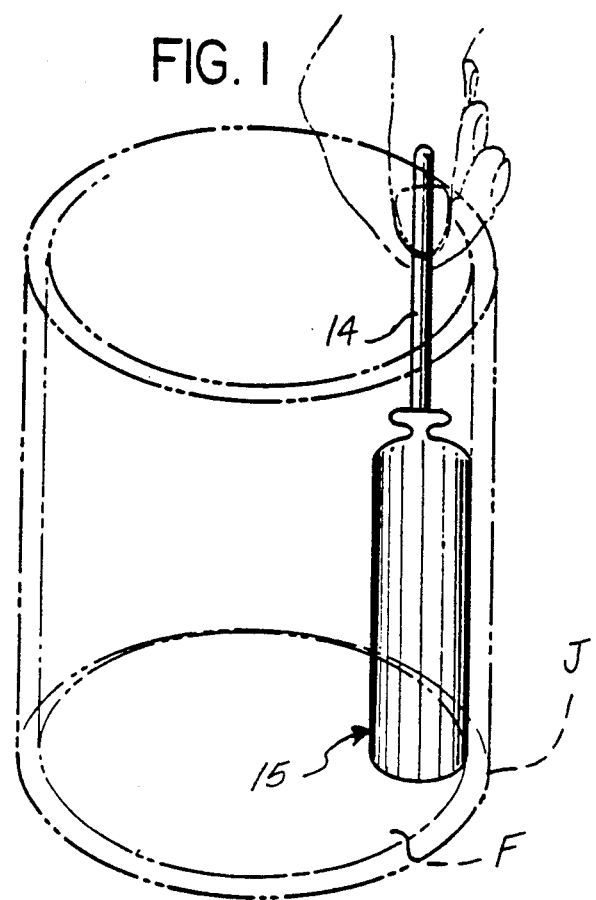
FIG. 1 is an isometric illustration of the invention in use.
Figure 2:
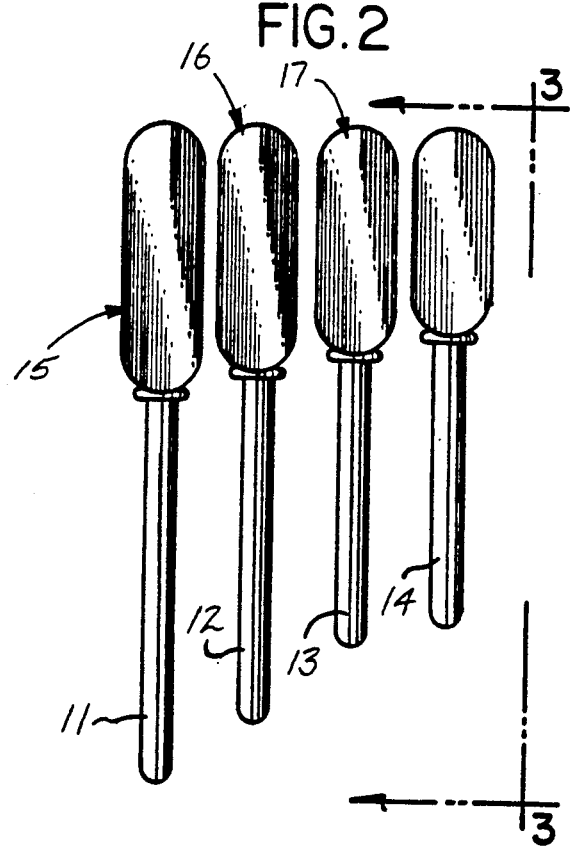
FIG. 2 is an orthographic view of the utensil members of the invention.
Figure 3:
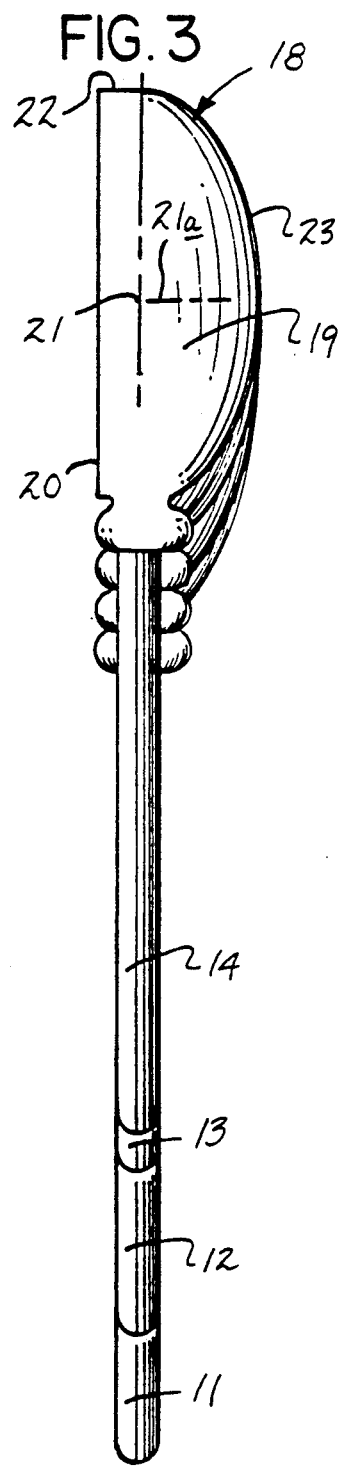
FIG. 3 is an orthographic view, taken along the lines 3—3 of FIG. 2 in the direction indicated by the arrows.
Figure 4A:
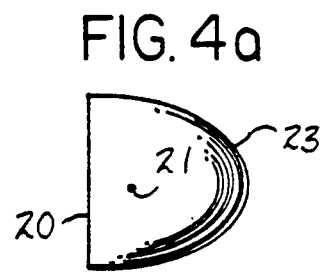
Figure 4B:
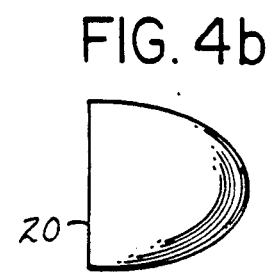
Figure 4C:
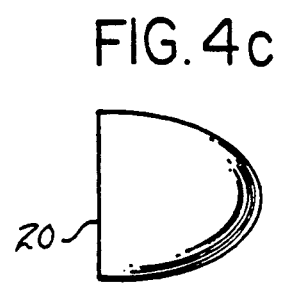
Figure 4D:
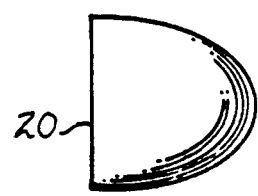
Figure 5:
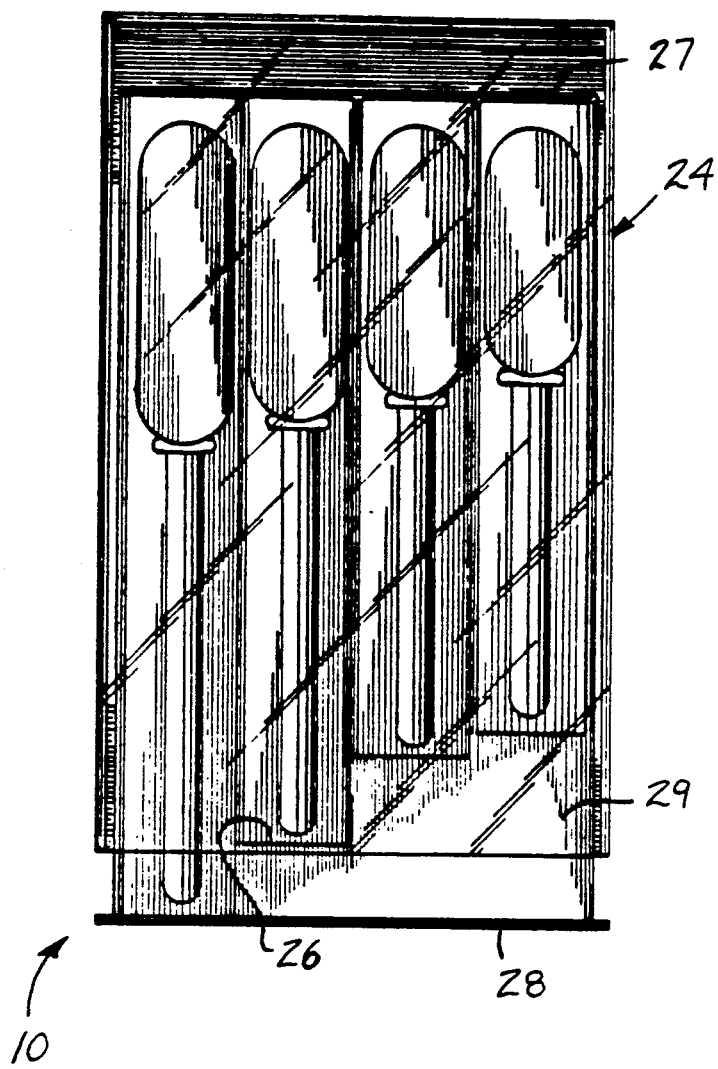
FIG. 5 is an orthographic view of the utensil members positioned within a housing structure.
Figure 6:
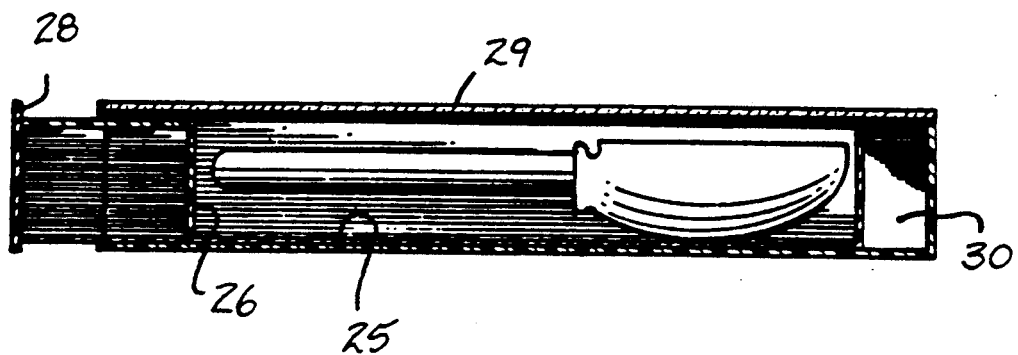
FIG. 6 is an orthographic cross-sectional illustration of the housing structure.

With reference now to the drawings, and in particular to FIGS. 1 to 8 thereof, a new and improved jar utensil kit embodying the principles and concepts of the present invention and generally designated by the reference numeral 10 will be described.

More specifically, the jar utensil kit 10 of the instant invention essentially comprises a plurality of spoons comprising a first, second, third, and fourth spoon having respective first, second, third, and fourth rigid handle shafts 11, 12, 13, and 14 respectively. The shafts have respective first, second, third, and fourth resilient heads 15, 16, 17, and 18 mounted thereon. The first shaft has a first length greater than the second length to the second shaft, which in turn has a second length greater than a third length of the third shaft, with the third shaft having a third length greater than a fourth length of the fourth shaft. The resilient heads are each mounted about a body major axis 21 (see FIG. 3) that is longitudinally aligned with the associated handle shaft. The first head 15 is of a first length greater than a second head length of the second head 16, which in turn is greater than a third head length of the third head 17, wherein the third head length 17 is greater than a fourth head length of the fourth head 18. Each head includes a planar body side wall 20 that is arranged in a parallel spaced relationship relative to the major axis 21 and orthogonally oriented relative to the minor axis 21a. Each head includes an ellipsoidal arcuate side wall 23 projecting laterally beyond the major axis 21, as indicated. The spoons are mounted in adjacency relative to one another within an associated container 24 that slidably mounts a housing therewithin. The housing includes a stepped housing first end wall 26 spaced from a second end wall 27, and a housing floor 25 mounting the individual first through fourth spoons. The container 24 includes a container cavity 30 to slidably receive in a complementary relationship the housing, wherein the container includes a transparent container top wall 29 to permit ease of viewing of the individual spoons for their access. A first end wall flange 28 is arranged extending beyond the stepped first end wall 26 for manual grasping of the housing.

Figure 7:
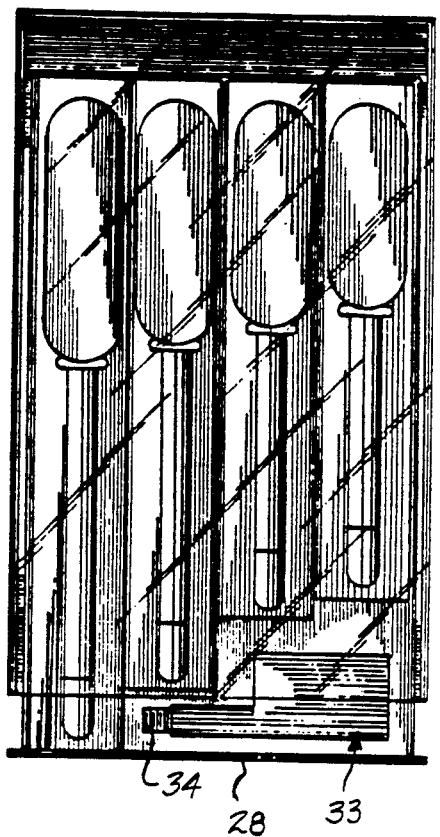
FIG. 7 is an orthographic top view of a modified housing structure.
Figure 8:
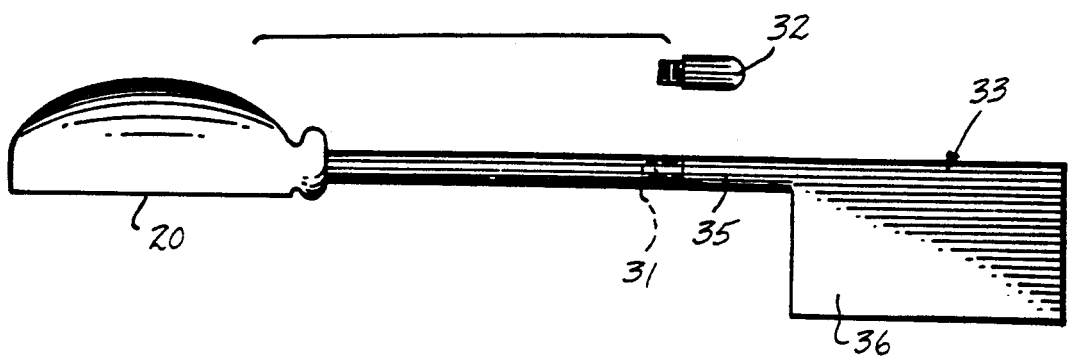
FIG. 8 is an orthographic side view of the housing structure utilizing a lever channel.

The FIG. 7 indicates the use of each handle having an individual handle threaded socket 31 at a free distal end of the handle that threadedly and removably mounts a socket plug 32. Removal of the socket plug 32 relative to each handle permits mounting of a lever extension 33 thereto to permit the lever to provide for ease of grasping and to provide for greater manipulation of each relative spoon relative to the jar "J" to direct an individual spoon about the jar floor "F", as indicated in FIG. 1. Each lever extension 33 includes a threaded end portion 34 received within a respective threaded socket 31, with an extension leg 35 projecting from the threaded end portion having a handle 36 extending laterally of the extension leg below the respective planar body side wall 20 of each respective spoon.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United states is as follows:

1. A jar utensil kit, comprising,
   a housing, with the housing having a housing floor, spaced housing side walls, housing stepped first end wall, and a housing second end wall, with a plurality of spoon members extending from the stepped first end wall to the second end wall, with the spoon members including a first spoon member having a first length, a second spoon member having a second length less than said first length, a third spoon member having a third length less than said second length, and the first spoon member having a first handle shaft, the second spoon member having a second handle shaft, and the third spoon member having a third handle shaft, and
   a first resilient head mounted to the first shaft, a second resilient head mounted to the second shaft, and a third resilient head mounted to the third shaft, and
   each head formed of resilient material and including symmetrical orientation about a predetermined axis, wherein the predetermined axis extends symmetrically through each respective handle shaft and each respective head, and
   each head includes a planar body side wall portion arranged in a parallel spaced relationship relative to the predetermined axis, and each ellipsoidal head including a minor axis, with the planar body side wall portion orthogonally oriented relative to the minor axis, and an ellipsoidal arcuate side wall extending about the predetermined axis, and a planar body end wall orthogonally oriented relative to the predetermined axis, and
   a container, with the container having a container cavity, with the housing slidably received within the container, and the container including a transparent container top wall, and a first end wall flange extending beyond the stepped first end wall for manual grasping of the housing, and a lever extension mounted between the first end wall flange and the stepped first end wall, with each handle having a handle threaded socket at a free distal end of said each handle, and each said handle having a threaded socket plug removably mounted relative to said threaded socket, with the lever extension including a threaded end portion threadedly received within said threaded socket, and a first extension leg longitudinally aligned relative to the threaded end portion, and an extension handle projecting laterally of the extension leg integrally mounted relative to the extension leg for enhanced ease of manual grasping of the lever extension.

* * * * *